UNITED STATES PATENT OFFICE 1,948,520

AMMONIATION OF SUPERPHOSPHATE

Edward W. Harvey, New Brunswick, N. J., assignor to The Barrett Company, New York, N. Y., a corporation of New Jersey No Drawing. Application January 10, 1930
Serial No. 420,008

8 Claims. (Cl. 71—7)

This invention relates to fertilizers, and particularly to fertilizer mixtures produced from a mono-calcium acid phosphate material. Superphosphate, double superphosphate, or mixtures containing one or both of the same are examples of the mono-calcium acid phosphate materials.

Superphosphate, for example, is frequently a constituent of fertilizer mixtures which also usually include nitrogen in a form assimilable by plants. Ammonia is a convenient and relatively inexpensive source of such nitrogen, and is, moreover, a desirable addition to superphosphate because it neutralizes free acid therein and thus affords heat by chemical reaction to drive off a part of the free moisture.

It has been proposed to treat superphosphate with ammonia in amount such that not more than 2 mols. of ammonia are available for reaction with every one mol. of water soluble $P_2O_5$. The reaction which occurs may be expressed by the equations

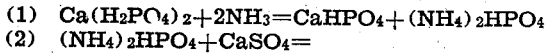
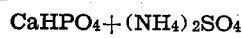

The addition of the ammonia causes part of the water-soluble mono-calcium acid phosphate to become "citrate soluble", and if an excessive quantity of ammonia is present, the water-soluble and citrate-soluble phosphate, which are considered available as plant food, revert to a citrate-insoluble or unavailable form. Consequently, the amount of ammonia which heretofore had been added to superphosphate was limited, and the advantage of this source of nitrogen in fertilizer mixtures containing superphosphate could not be fully secured.

In order to make a fertilizer containing both phosphate and nitrogen, and at the same time avoid the reversion caused by the ammonia, superphosphate and ammonium sulfate are often mixed either with or without other fertilizer constituents. Such mixtures, however, are subject to chemical reaction which causes caking of the mass. It is necessary, therefore, to cure such a mixture by exposing it in large piles for periods ranging from several days to months, and then to regrind the mass before it is placed in bags or other receptacles for shipment to the consumer. The storage and regrinding involve considerable additional expense which increases the cost of the fertilizer.

It is an object of the present invention to reduce the formation of "unavailable" phosphorus in the treatment of mono-calcium acid phosphate with ammonia. It is a further object to make possible the use of greater quantities of ammonia with such materials without excessively reducing the fertilizing value of the phosphate contained therein. It is an object of this invention to avoid the necessity for regrinding fertilizer mixtures prepared from mono-calcium acid phosphate and ammonium sulfate, and to provide a method of preparing such mixtures whereby a product is obtained which is capable of retaining indefinitely its original granular or friable form, i. e., a commercially non-caking fertilizer. A further object of this invention is to prepare fertilizer mixtures containing ammoniacal nitrogen, superphosphate, and fertilizer salts of the type of ammonium sulfate and potassium sulfate which do not cake into hard masses which require grinding before being suitable for sale in commerce.

I have discovered that certain salts repress the tendency of mono-calcium acid phosphate fertilizers when treated with ammonia to revert to unavailable or "citrate insoluble" form, i. e., insolubility of the phosphate fraction of the fertilizer when the fertilizer is extracted with neutral ammonium citrate solution. Consequently the presence of or addition of suitable proportions of one or more of these salts permits the advantageous introduction of a relatively large proportion of ammonia to the phosphate material and in excess of two molecular weights of ammonia for each molecular weight of water soluble $P_2O_5$ present in the phosphate material. These represser salts are ammonium sulfate, ammonium chloride, potassium chloride, potassium sulfate, and sodium acid sulfate.

A process of ammoniating superphosphate in the presence of a represser salt is also claimed in my application, Serial No. 602,103, filed Mar. 30, 1932. In carrying out my invention, the represser salt or salts, for example, ammonium sulfate, may be employed as a solid or in solution, and it may be incorporated with the mono-calcium acid phosphate material before the ammonia is added thereto, simultaneously with or after the addition of the ammonia. Aqua ammonia of any strength may be employed, from crude ammonia liquor containing about 15% $NH_3$ up to aqua ammonia containing 50% or more $NH_3$. Also, by using suitable plant equipment, gaseous or liquid anhydrous ammonia may be employed.

I have further found that the objectionable caking tendency of mixtures of mono-calcium acid phosphate materials, such as superphosphate, with ammonium sulfate may be inhibited and at the same time, the nitrogen content of the mixture still further increased by treatment with ammonia so that the product is not only commercially stable with respect to reversion, but also retains its granular or friable form. It has also been found that ammoniated superphosphate may be mixed with salts of the type of ammonium sulfate and potassium sulfate to form valuable fertilizers which do not cake into hard masses requiring grinding before use as a fertilizer, but retain a granular or friable form.

The following are examples of my invention:

*Example I.*—403 lbs. of superphosphate are mixed with about 60 lbs. of ammonium sulfate. This mixture is then treated with about 36.5 lbs. of aqua ammonia containing 25% $NH_3$ which is the equivalent of about 23 pounds of ammonia for every 1,000 pounds of superphosphate. In the fertilizer thus produced, 94.5% of the $P_2O_5$ is in an available condition.

*Example II.*—385 lbs. of superphosphate are mixed with about 58 lbs. of ammonium sulfate and the mixture treated with about 58 lbs. of aqua ammonia containing 25% $NH_3$ which is the equivalent of about 37½ pounds of ammonia for every 1,000 pounds of superphosphate. In the fertilizer thus produced, 92.4% of the $P_2O_5$ is in an available condition.

*Example III.*—312 lbs. of superphosphate are mixed with about 117 lbs. of ammonium sulfate and the mixture treated with about 70.5 lbs. of aqua ammonia containing 25% $NH_3$ which is the equivalent of about 56½ pounds of ammonia for every 1,000 pounds of superphosphate. In the fertilizer thus produced, 90.6% of the $P_2O_5$ is in an available condition.

With the use of increasing amounts of ammonia, the tendency of available $P_2O_5$ in the original superphosphate to revert to an unavailable form increases. This tendency is markedly counteracted by the presence of ammonium sulfate, which should be used in increasing amount as the amount of ammonia is increased. For example, when 105 lbs. of aqua ammonia containing 25% $NH_3$ is used for treating 1000 lbs. of superphosphate, a mixture is obtained which 91.5% of the $P_2O_5$ is available is obtained by employing about 105 lbs. of ammonium sulfate; whereas when 225 lbs. of 25% aqua ammonia are employed in the treatment of the same amount of superphosphate, about 300 lbs. of ammonium sulfate is required to produce a fertilizer in which 90.5% of the $P_2O_5$ is available. In general, it has been found that commercial fertilizers having satisfactory characteristics as respects their tendency for the $P_2O_5$ content to revert, may be prepared by employing the materials in the ratios by weight of ammonia ($NH_3$) to ammonium sulfate to superphosphate, varying from about 20:50:1000 to about 60:1000:1000. The superphosphate contains about 30% mono-calcium phosphate. The corresponding ratios of ammonia to ammonium sulfate to mono-calcium phosphate are, therefore, from about 20:50:300 to about 60:1000:300.

It is evident that instead of adding the represser salt as such or previously formed to the phosphate material, it may be formed in situ. For example, the desired ammonium sulfate might be incorporated in the material by first adding the equivalent amount of sulfuric acid and increasing the ammonia of the ammonia treatment by a corresponding amount. Accordingly, when in the claims is used the phrase "treating with a represser salt" or "treating with ammonium sulfate", it is intended that the salt may be added previously formed or formed in situ. Obviously, the terms "represser salt" and "ammonium sulfate" do not and it is not intended that they should include the ammonium sulfate formed in the old processes heretofore proposed for the treatment of superphosphate and the like with ammonia.

Two or more represser salts may be used in the production of a single fertilizer product.

As indicated hereinabove, and particularly as shown in Example III, my invention makes possible the use of substantially more ammonia in the treatment of superphosphate materials than heretofore considered practicable, for example as in the process of Hagens' U. S. P. 1,699,393. Accordingly, in the preferred method of treating superphosphate, the product contains citrate soluble or plant available phosphate and ammonium sulfate, the ammonium sulfate being present in excess of that formed by reaction between the ammonia and the superphosphate material. The product may also contain other ingredients. For example, a fertilizer containing urea may be prepared by employing an aqueous solution containing both ammonia and urea in the process described. If desired, these additional materials such as urea, ammonium carbonate, sand, etc., may be mixed with the product obtained after the treatment of the superphosphate with ammonia.

The invention affords a simple and effective method of preparing fertilizer mixtures and permits the utilization of ammonia with materials containing mono-calcium acid phosphate in proportions which otherwise are impracticable because of losses entailed by reversion. An effective and economical fertilizer is thus produced by the practice of the invention. When in this specification and the appended claims the term "represser salt" is used it is intended to refer to one or more of the following salts: ammonium sulfate, ammonium chloride, potassium chloride, potassium sulfate and sodium acid sulfate.

I claim:

1. In a process for producing a nitrogen-phosphorous fertilizer by treating a superphosphate material with ammonia, that improvement which comprises incorporating ammonia with a mixture of a superphosphate material and a represser salt in the proportions of not substantially less than about 23 pounds of ammonia for every 1,000 pounds of superphosphate in said mixture whereby reversion of available $P_2O_5$ in the superphosphate to an unavailable form is inhibited by the represser salt present during the ammoniation treatment of the superphosphate material.

2. In a process for producing a nitrogen-phosphorous fertilizer by treating a superphosphate material with ammonia, that improvement which comprises admixing a superphosphate material with a represser salt and then incorporating ammonia with said mixture in the proportions of not substantially less than about 23 pounds of ammonia for every 1,000 pounds of superphosphate in said mixture whereby reversion of available $P_2O_5$ in the superphosphate to an unavailable form is inhibited by the represser salt present during the ammoniation treatment of the superphosphate material.

3. In a process for producing a nitrogen-phosphorous fertilizer by treating a superphosphate material with ammonia, that improvement which comprises incorporating ammonia and a represser salt in aqueous solution with a superphosphate material in the proportions of not substantially less than about 23 pounds of ammonia for every 1,000 pounds of superphosphate in said mixture whereby reversion of available $P_2O_5$ in the superphosphate to an unavailable form is inhibited by the represser salt present during the ammoniation treatment of the superphosphate material.

4. In a process for producing a nitrogen-phosphorous fertilizer by treating a superphosphate material with ammonia, that improvement which comprises incorporating ammonia with a mixture of a superphosphate material and ammonium sulfate in the proportions of not substantially less than about 23 pounds of ammonia for every 1,000 pounds of superphosphate in said mixture whereby revision of available $P_2O_5$ in the superphosphate to an unavailable form is inhibited by the ammonium sulfate present during the ammoniation treatment of the superphosphate material.

5. In a process for producing a nitrogen-phosphorous fertilizer by treating a superphosphate material with ammonia, that improvement which comprises incorporating ammonia with a mixture of a superphosphate material and potassium chloride in the proportions of not substantially less than about 23 pounds of ammonia for every 1,000 pounds of superphosphate in said mixture whereby reversion of available $P_2O_5$ in the superphosphate to an unavailable form is inhibited by the potassium chloride present during the ammoniation treatment of the superphosphate material.

6. In a process for producing a nitrogen-phosphorous fertilizer by treating a superphosphate material with ammonia, that improvement which comprises incorporating ammonia with a mixture of a superphosphate material and a represser salt in the proportions of more than about 2 molecular weights of ammonia for each molecular weight of water soluble $P_2O_5$ present in said superphosphate material, whereby reversion of available $P_2O_5$ in the superphosphate to an unavailable form is inhibited by the represser salt present during the ammoniation treatment of the superphosphate material.

7. In a process for producing a nitrogen-phosphorous fertilizer by treating a superphosphate material with ammonia, that improvement which comprises admixing a superphosphate material with a represser salt and then incorporating ammonia with said mixture in the proportions of more than about 2 molecular weights of ammonia for each molecular weight of water soluble $P_2O_5$ present in said superphosphate material, whereby reversion of available $P_2O_5$ in the superphosphate to an unavailable form is inhibited by the represser salt present during the ammoniation treatment of the superphosphate material.

8. In a process for producing a nitrogen-phosphorous fertilizer by treating a superphosphate material with ammonia, that improvement which comprises incorporating ammonia and a represser salt in aqueous solution with a superphosphate material in the proportions of more than about 2 molecular weights of ammonia for each molecular weight of water soluble $P_2O_5$ present in said superphosphate material, whereby reversion of available $P_2O_5$ in the superphosphate to an unavailable form is inhibited by the represser salt present during the ammoniation treatment of the superphosphate material.

EDWARD W. HARVEY.